(No Model.)
C. L. BLUBAUGH.
RAILROAD BICYCLE.
No. 592,507. Patented Oct. 26, 1897.
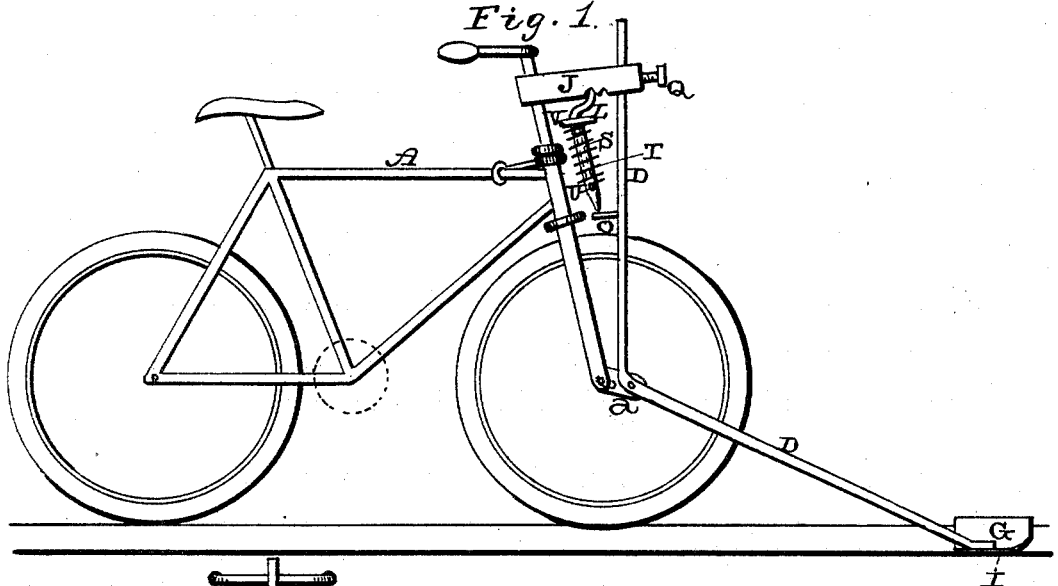
Fig. 1.
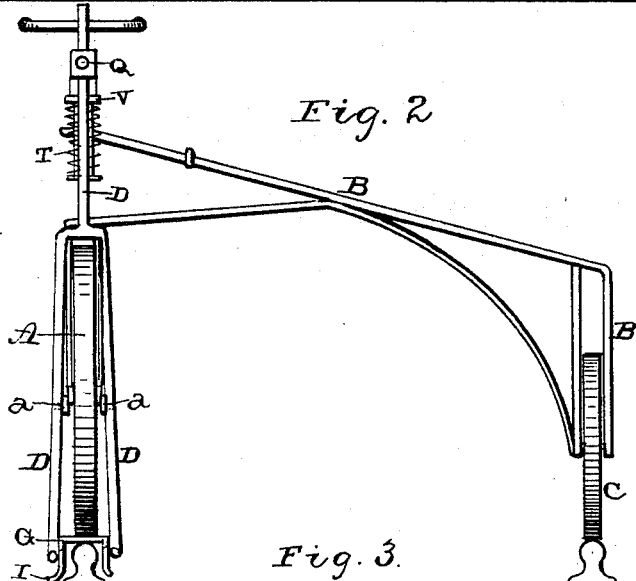
Fig. 2.
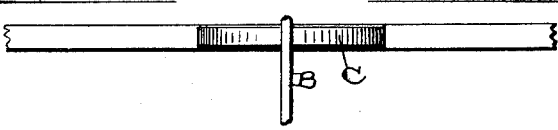
Fig. 3.
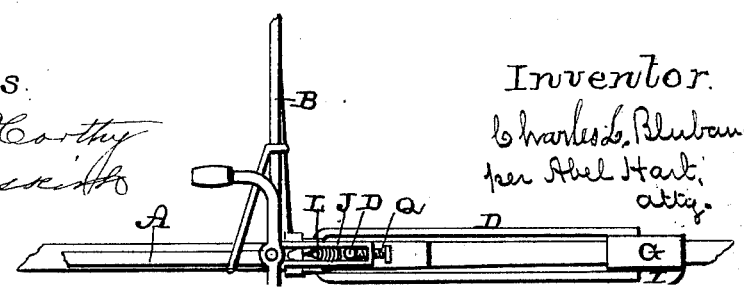
Witnesses. Inventor.
Thos. B. McCarthy Charles L. Blubaugh
H. A. Van Buskirk per Abel Hart,
atty.

UNITED STATES PATENT OFFICE.

CHARLES L. BLUBAUGH, OF HOWARD, OHIO.

RAILROAD-BICYCLE.

SPECIFICATION forming part of Letters Patent No. 592,507, dated October 26, 1897.

Application filed April 14, 1897. Serial No. 632,123. (No model.)

*To all whom it may concern:*

Be it known that I, CHARLES L. BLUBAUGH, a citizen of the United States, residing at Howard, in the county of Knox and State of Ohio, have invented certain new and useful Improvements in Railroad-Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in railroad-bicycles; and it consists in an ordinary bicycle provided with thick flat rubber tires, a brace attached to the bicycle and extending across the track and carrying a third wheel at its outer end, combined with a guide which is pivotally attached at the front of the bicycle and which slides along upon or above one of the rails of the track, and a spring attachment by means of which the guide is held in a raised or depressed position, as will be more fully described hereinafter.

The object of my invention is to provide a bicycle having three wheels and which is adapted to run upon a railroad-track with great rapidity and with very little exertion to the rider.

Figure 1 is a side elevation of a bicycle which embodies my invention. Fig. 2 is a front view. Fig. 3 is a plan view.

A represents an ordinary bicycle which is provided with flat heavy solid rubber tires and which runs upon one of the rails of the track. Secured to this bicycle in any suitable manner is the brace B, which extends across the track and has journaled in its outer end the small wheel C, which runs upon the other rail of the track and which is also provided with a solid flat rubber tire. This brace may be of any suitable construction, but should be light, strong, and just long enough to keep the wheel C squarely upon the rail.

Pivoted to the lower front end of the bicycle-frame, by means of a link hinge $a$, provided with a slot in its rear end, is the lever D, which carries at its lower front pronged end the guide or shoe G. This guide or shoe is made U-shaped, so as to fit over the top of the rail, and is flared at its front end upon both sides, so that it will pass freely over the joints or any irregularities in the rails. The front outer corner is turned outward and upward, so that the guide will pass freely between the outside of the rail and the edges of the boards at crossings, provided the space between them is clear, and if not entirely clear the turned-up corner will cause the guide or shoe to ride up over the obstructions and then drop back upon the track as soon as the crossing is passed. This turned-out portion forms a flange I all along the outer edge of the shoe or guide, and hence after it has risen upon any obstruction it holds the guide or shoe in the raised position until the shoe or guide is entirely past it. Were it not for this flange with the turned-up front end the shoe or guide would be liable to catch against obstructions greatly to the danger of the rider.

In order to hold the guide or shoe positively either in position upon the rail or raised above it, the upper end of the lever is held in the loop J, which extends forward from the steering-post and which is of sufficient length to allow the upper end of the lever to play freely back and forth therein. To hold this lever in the desired position, the spring-actuated catch L is used. The catch L consists of the lower hollow portion S, in which the lower end of the catch L is inserted and around which lower portion S is placed a spring E, which bears against a plate V, which is rigidly secured directly to the catch L, and by means of which spring the catch L is kept constantly pressed upward. On the rear side near the upper end of the lever is formed a support O, upon which the lower end of the part S rests. The upper end of the catch is bifurcated, and its two ends are curved and turned forward, so as to engage with ratchet-teeth formed in the lower edge of the guiding-loop. By moving this upper end forward or back upon the ratchet-teeth the tension of the spring is increased or decreased to any desired extent, according to the pressure necessary to exert upon the shoe or guide to hold it upon or above the rail. As the catch is forced upwardly the spring is compressed to a greater degree than it is when the catch is moved rearwardly toward the front of the bicycle.

In order to regulate the distance that the upper end of the lever shall move forward in the loop, a set-screw Q is passed through the front end of the loop, and this set-screw, by bearing against the front edge of the upper end of the lever, regulates the distance that the shoe shall sink down over the top of the rail.

The lower end of the shoe or guide lever being bifurcated and straddling the front wheel of the bicycle prevents this wheel from turning and holds the wheel rigidly in a line with the guide. The consequence is the handles are locked in position when the guide is down upon the rail, and hence the wheels cannot be made to leave the track under ordinary circumstances. After the guide is lowered upon the rail the rider has only to work the pedals, using the handle to steady him in position.

Having thus described my invention, I claim—

1. A bicycle, adapted for running upon railroad-tracks, combined with a loop attached to the guiding-post, a pivoted lever attached to the frame of the bicycle, and a guide or shoe attached to the front end of the lever, combined with a set-screw which passes through the loop and regulates the distance that the lever shall move forward, substantially as described.

2. A bicycle adapted to run upon the rails of a track, combined with a guiding-loop secured to the bicycle, a pivoted lever carrying a guide or shoe at its front end and a spring-actuated catch for holding the lever in position, substantially as set forth.

3. A bicycle adapted to move upon a railroad-track and a guiding-loop secured thereto, combined with a lever pivoted upon the bicycle, and which has a shoe or guide secured to its front end, and which lever is made to straddle the front wheel, a spring-actuated catch carried by the lever, and having its upper end to bear against the guiding-loop, and a set-screw passing through the front end of the loop to regulate the distance that the upper end of the lever shall move forward.

In testimony whereof I affix my signature in presence of two witnesses.

CHARLES L. BLUBAUGH.

Witnesses:
CHANEY V. BURRIS,
GEO. SHAW.